United States Patent
Sun et al.

(10) Patent No.: US 10,191,535 B2
(45) Date of Patent: Jan. 29, 2019

(54) REDUCED ENERGY CONSUMPTION IN A COMPUTER SYSTEM THROUGH SOFTWARE AND HARDWARE COORDINATED CONTROL OF MULTIPLE POWER SUPPLIES

(71) Applicant: Apple Inc., Cupertino, CA (US)

(72) Inventors: Adrian E. Sun, Mountain View, CA (US); Bharat K. Patel, San Jose, CA (US); Erik A. Gutfeldt, Palo Alto, CA (US); Mark K. Sin, Santa Clara, CA (US); Kim Phuong T. Truong, San Jose, CA (US); Steve Xing-Fu Zhou, San Jose, CA (US); Asif Iqbal, Los Altos Hills, CA (US); Paul S. Michelsen, San Jose, CA (US); Lee M. Schaff, Cupertino, CA (US); Steven Ichung Kuo, Sunnyvale, CA (US); Chad O. Simpson, San Jose, CA (US); Derrick C. Lau, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/512,951

(22) Filed: Oct. 13, 2014

(65) Prior Publication Data
US 2015/0106638 A1    Apr. 16, 2015

Related U.S. Application Data

(60) Provisional application No. 61/890,810, filed on Oct. 14, 2013.

(51) Int. Cl.
G06F 1/00 (2006.01)
G06F 1/26 (2006.01)

(52) U.S. Cl.
CPC ............ *G06F 1/3296* (2013.01); *G06F 1/263* (2013.01); *G06F 1/266* (2013.01); *Y02D 10/172* (2018.01); *Y02D 50/20* (2018.01)

(58) Field of Classification Search
CPC ..................................................... G06F 1/3203
(Continued)

(56) References Cited

U.S. PATENT DOCUMENTS

| 4,754,213 A | * | 6/1988 | Dubot et al. ................... 323/326 |
| 6,515,379 B1 | * | 2/2003 | Nojima et al. ................... 307/64 |

(Continued)

FOREIGN PATENT DOCUMENTS

| CN | 1092878 | 9/1994 |
| CN | 1252546 | 5/2000 |

(Continued)

OTHER PUBLICATIONS

Chinese Patent for Utility Model No. ZL201420753975.7—Evaluation Report for Utility Model Patent dated Jul. 15, 2015.

*Primary Examiner* — Suresh Suryawanshi
(74) *Attorney, Agent, or Firm* — Blank Rome LLP

(57) ABSTRACT

The embodiments discussed herein relate to systems, methods, and apparatus for controlling power consumption of a computing device in a standby or sleep mode. During the standby or sleep mode an external device can be plugged into the computing device. The external device can be provided power from a standby power supply until a determination is made as to whether a main power supply is operating. The determination can be based on comparing the output of the main power supply to an output of the standby power supply. If the main power supply is operating, a switch in the computing device can close to allow the main power supply to provide power to the external device. Moreover, in some embodiments, the switch can close based (Continued)

exclusively on a current demand of the external device from the standby power supply.

11 Claims, 9 Drawing Sheets

(58) Field of Classification Search
USPC .......................................................... 713/323
See application file for complete search history.

(56) References Cited

U.S. PATENT DOCUMENTS

| | | | | |
|---|---|---|---|---|
| 6,642,750 | B1* | 11/2003 | Egan | H02J 1/08 |
| | | | | 327/63 |
| 7,161,495 | B1* | 1/2007 | Kilbourne, II | G06F 1/263 |
| | | | | 340/506 |
| 7,675,760 | B2* | 3/2010 | Makino | H02M 3/3385 |
| | | | | 363/21.04 |
| 7,698,574 | B2* | 4/2010 | Morimoto | B41J 29/393 |
| | | | | 713/300 |
| 7,882,371 | B2* | 2/2011 | Yano | 713/300 |
| 7,966,501 | B2* | 6/2011 | Kitamrua | G03G 15/80 |
| | | | | 713/300 |
| 8,164,932 | B2* | 4/2012 | Sims | H02M 7/02 |
| | | | | 363/125 |
| 8,364,993 | B2 | 1/2013 | Rui et al. | |
| 8,422,905 | B2* | 4/2013 | Yashiro | 399/88 |
| 8,610,456 | B2* | 12/2013 | Chiaburu et al. | 326/30 |
| 8,854,838 | B2* | 10/2014 | Hara et al. | 363/16 |
| 9,047,808 | B2* | 6/2015 | Cho | G09G 3/2092 |
| 9,048,687 | B2* | 6/2015 | Nakajima et al. | |
| 9,703,363 | B2* | 7/2017 | Zhou | G06F 1/3287 |
| 2006/0200684 | A1* | 9/2006 | Bibikar | G06F 1/3203 |
| | | | | 713/300 |
| 2009/0063877 | A1 | 3/2009 | Lewis et al. | |
| 2011/0221483 | A1 | 9/2011 | Liu et al. | |
| 2011/0252253 | A1 | 10/2011 | Rui et al. | |
| 2012/0159202 | A1* | 6/2012 | Xu | G06F 1/263 |
| | | | | 713/300 |
| 2012/0161521 | A1 | 6/2012 | Hung | |
| 2013/0043727 | A1* | 2/2013 | Liu | G06F 1/26 |
| | | | | 307/31 |
| 2015/0005976 | A1* | 1/2015 | Akebono et al. | 700/297 |
| 2015/0069842 | A1* | 3/2015 | Niu | H02J 9/061 |
| | | | | 307/64 |
| 2015/0180278 | A1* | 6/2015 | Tsai | 307/23 |
| 2015/0311705 | A1 | 10/2015 | Terlizzi et al. | |

FOREIGN PATENT DOCUMENTS

| | | |
|---|---|---|
| CN | 101897100 A | 11/2010 |
| CN | 102377233 | 3/2012 |
| CN | 102474188 A | 5/2012 |
| CN | 102640076 | 8/2012 |
| EP | 2386933 | 11/2011 |

* cited by examiner

REDUCED ENERGY CONSUMPTION IN A COMPUTER SYSTEM THROUGH SOFTWARE AND HARDWARE COORDINATED CONTROL OF MULTIPLE POWER SUPPLIES

CROSS-REFERENCE TO RELATED APPLICATION(S)

The present application claims the benefit of U.S. Provisional Application No. 61/890,810, entitled "REDUCED ENERGY CONSUMPTION IN A COMPUTER SYSTEM THROUGH SOFTWARE AND HARDWARE COORDINATED CONTROL OF MULTIPLE POWER SUPPLIES" filed Oct. 14, 2013, the content of which is incorporated herein by reference in its entirety for all purposes.

FIELD

The described embodiments relate generally to efficiently using multiple power supplies in a computing device. More particularly, the present embodiments relate to a control scheme for switching on a power supply based on an external load coupled to the computing device during a standby or sleep mode of the computing device.

BACKGROUND

A computing device such as a desktop or laptop can in some instances make inefficient use of their respective power supplies. When a desktop is idle, a power supply may be configured to continue operating an internal power supply causing the power supply to inefficiently consume power despite the desktop being relatively inactive. Additionally, when external devices are connected to the desktop, the external devices may require a minimum amount of power in order to operate correctly. If the desktop is operating in a lower power state without the ability to boost power, the device can malfunction and in some instances result in the loss of data due to lack of power. Moreover, if the device pulls more current than what the desktop is expecting, the desktop can potentially malfunction or otherwise shutdown.

SUMMARY

The embodiments discussed herein relate to systems, methods, and apparatus for enabling one or more power supplies to assist a standby power supply based on a load connected to a computing device during a sleep or standby power mode. In some embodiments, a control circuit for enabling a connection of a main power supply is set forth. The control circuit can include a signal detector configured to compare an output of a standby power supply to a signal threshold. The signal threshold is based on an output of a voltage divider electrically coupled to the main power supply. The control circuit can further include a switch electrically coupled between the main power supply and a load. The switch can be configured to close when an output of the main power supply is greater than or equal to a signal threshold.

In other embodiments a computing system is set forth. The computing system can include a standby power supply electrically coupled to a sensor configured to measure an output from the standby power supply during a standby mode of the computing system. The computing system can further include a controller electrically coupled to the sensor. The controller can be configured to receive a sensor signal from the sensor when the output reaches or exceeds an output threshold, and enable a main power supply to provide power to a load removably attached to the computing system.

In yet other embodiments, a machine-readable non-transitory storage medium is set forth. The storage medium can store instructions that, when executed by a processor included in a computing device, can cause the computing device to perform steps that include supplying, while the computing device is in a standby power mode, power from a standby power supply to a load that is external to the computing device. Additionally, the steps can include, when an output of a main power supply reaches or exceeds an output threshold, closing a switch configured to provide a conductive pathway between the main power supply and the load.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
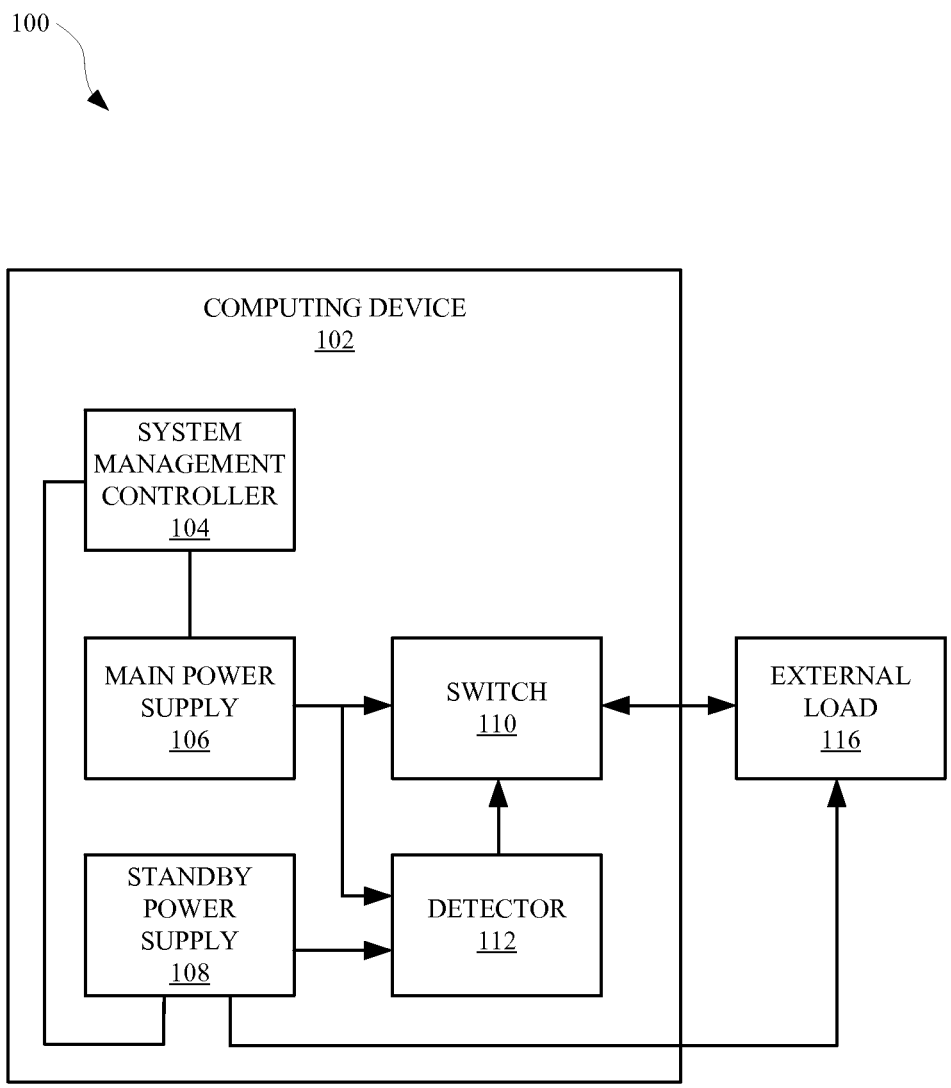
FIG. 1 illustrates a system diagram for intelligently switching on or off a main power supply based on the energy demands of a load.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The embodiments discussed herein relate to systems, methods, and apparatus for transitioning between power modes of a computing device in order to reduce power consumption. In order to effectively transition between power modes to reduce power consumption, multiple power supplies are configured within the computing device. The power supplies can be enabled or disabled according to different operational characteristics of the computing device at a given time. Such operational characteristics can correspond to power requirements necessary to efficaciously power an external device connected to the computing device. For example, one of the multiple power supplies can be a standby power supply configured to operate during a power mode corresponding to when the computing device is idle and requires a minimum amount of current or voltage. A main power supply can be configured within the computing device to provide current when the computing device is not idle or otherwise requires a larger amount of current or voltage than what the standby power supply is designed to handle. Although this arrangement of multiple power supplies is useful, the execution of transitions between power modes can ultimately determine the whether the arrangement will result in a more efficient use of power. For example, if the external device is connected to the computing device when the computing device is in a sleep mode, the computing device may not be configured to switch power modes. As a result, the external device may be forced to exclusively rely on a standby power supply and cause the standby power supply to malfunction or otherwise shutdown down because of the burden from both the external device and computing device. Therefore, transitioning between power modes can be imperative to improving energy efficiency of the computing device.

In some embodiments discussed herein, a dynamic switching system for transitioning between power modes is set forth. The switching system can determine whether a non-standby power supply has been turned or whether an output current threshold has been exceeded as a result of an external device being plugged into the computing device. If a non-standby power supply is determined to be on, the detection circuit can close a switch between the non-standby power supply and the external device. In this way, the standby power supply will not be overburdened by the external device because the non-standby power supply will be able to contemporaneously provide additional power to the external device. If the switching system determines that the output current threshold has been exceeded, the switching system can send a sensor signal to a system management controller of the computing device in order to turn on a non-standby power supply. By turning on the non-standby power supply, the non-standby power supply will be able to provide additional current to the external device thereby mitigating current demanded from the standby power supply.

In order for the switching system to make determinations regarding operations of the standby power supply and non-standby power supply, the system can include a detection circuit. The detection circuit can be configured to compare the respective voltage outputs of the standby power supply and non-standby power supply. In some embodiments, a detector or comparator circuit is used in combination with a voltage divider circuit to perform the comparison. The voltage divider circuit acts to reduce an output voltage of the non-standby power supply to the comparator circuit. For example, the output voltage can be reduced such that the comparator will switch logical states when the reduced voltage output of the non-standby power supply is approaching a voltage equal to the standby voltage. However, the voltage divider can be modified to cause the comparator to switch logical states according to any other suitable voltage value, greater than or less than the operating voltage for the standby power supply.

The switching system can also include a switching circuit in order to react to one or more outputs from the detection circuit. The switching circuit can receive an output signal from the comparator and determine whether to close or open a connection between the non-standby power supply and an external device. In this way, when the switching circuit is open, the external device can be powered by the standby power supply so long as the comparator circuit is not outputting a signal indicative of increased activity or output from the non-standby power supply. However, if the external device needs additional power that cannot efficiently be provided by the standby power supply, the switching circuit can close according to either the output of the comparator circuit, or an output of a current or voltage sensor. The current or voltage sensor can be electrically coupled to the switching circuit in order to enforce a current or voltage threshold on an input to an external device. The sensor can be configured to cause a system management controller to enable the non-standby power supply when the current or voltage threshold is exceeded. As a result, when the current or voltage threshold is exceeded and a non-standby power supply is turned on, the comparator circuit will output a logical signal indicating that the non-standby power supply is on. Thereafter, the switching circuit will close, thus enabling the non-standby power supply to assist the standby power supply in providing power.

The switching circuit can also be closed based on signals generated by software running at the computing device or the external device. For example, when the external device includes memory (e.g., a universal serial bus (USB) hard drive), the external device or software of the computing device can cause the non-standby power supply to turn on and the switching circuit to close in order to avoid brownouts occurring at the memory. This can be performed based on the size of the memory, or a minimum voltage or current required by the external device to avoid brownouts. Additionally, the software can determine whether the external device is a bus-powered device (e.g., a human interface device (HID)) that will require power from the non-standby power supply. In response, when only the standby power supply is running, the software can cause the non-standby power supply to turn on or turn off according to the type of external device that is plugged in.

Other embodiments discussed herein relate to systems, methods, and apparatus for detecting improper assembly of a computing device. In order to detect improper assembly, measurements of voltage or current can be taken at multiple bus bars of the computing device where one or more printed circuit boards (PCB's) are connected. When the computing device is not assembled properly, certain power components such as the bus bar can have an impedance exceeding their respective design specification. As a result of the high impedances, inadequate voltage outputs are provided to the loads, which are detected according to the embodiments discussed herein. The voltage outputs can be sampled periodically and tracked overtime using a tracking system in order to distinguish variations in voltage outputs from noise that naturally occurs during normal operations of the computing device. If the tracking system determines the voltage output of a bus bar is being affected by an assembly issue, the tracking system can cause the computing device to sleep or shutdown certain portions of the computing device. Additionally, in some embodiments the computing device can display a warning message when the user wakes the computing device from a sleep or idle state. In this way, the user can be instructed to have the computing device repaired according to the warning message.

These and other embodiments are discussed below with reference to FIGS. 1-9. However, those skilled in the art will readily appreciate that the detailed description given herein with respect to these Figures is for explanatory purposes only and should not be construed as limiting.

FIG. 1 illustrates a system diagram 100 for intelligently switching on or off a main power supply 106 based on the energy demands of an external load 116. The computing device 102 can be any suitable computing device 102 capable of supplying power to the external load 116 such as an accessory or auxiliary device. The computing device 102 can therefore be a desktop computer, laptop computer, workstation computer, cellular phone, media player, or any other suitable computing device 102. The external load 116 can be any device or component capable of being supplied power from the computing device 102. The external load 116 can be a load requiring varying amounts of energy or power to operate. For example, the external load 116 can be a device that requires a small amount of power to operate (e.g., less than or equal to 5 watts). The external load 116 can also be a device that requires a large amount of power to operate (e.g., greater than 5 watts, possibly hundreds of watts). In some embodiments, the external load 116 can be multiples devices electrically coupled to the computing device 102. The computing device 102 supplies power to the external load 116 using a main power supply 106 and/or a standby power supply 108. However, it should be noted that additional power supplies may be provided in other embodiments without exceeding the scope of this disclosure. The standby power supply 108 can be configured to continuously provide power to the external load 116, and the main power supply 106 can be configured to provide power to the external load 116 only when a switch 110 is closed. Alternatively, the standby power supply 108 can be deactivated when the main power supply 106 is providing power to the external load 116. In some embodiments, the external load 116 can vary the amount of energy required to operate the external load 116. Specifically, the external load 116 can transition from a power level that can be powered by the standby power supply 108 to a power level that is above the power level of the standby power supply 108. As a result, the switch 110 can be activated thereby enabling the main power supply 106 to provide power to the external load(s) 116.

Initially, in order for the main power supply 106 and standby power supply 108 to be active, a system management controller (SMC) 104 can be configured to provide enabling signals to each of the main power supply 106 and standby power supply 108. The enabling signals can be based on an operating mode of the computing device 102 and/or whether the external load 116 is connected to the computing device 102. When the enabling signals are based on the operating mode, the main power supply 106 can be off and the standby power supply 108 can be on when the computing device 102 is in a sleep mode or hibernate mode. In some embodiments, the main power supply 106 and the standby power supply 108 can both be on when the computing device 102 is in a sleep mode or hibernate. Otherwise, both the main power supply 106 and the standby power supply 108 can both be on when the computing device 102 is being operated by a user, or the computing device 102 is otherwise in a wake state. However, when the external load 116 is connected to the computing device 102, the main power supply 106 can be active but not necessarily providing power to the external load 116. Meanwhile, the standby power supply 108 can be configured to provide power to the external load 116. In order to provide power to the external load 116 from the main power supply 106, the switch 110 can be closed according to an output from a detector 112, as discussed herein.

The detector 112 is electrically coupled between the main power supply 106 and the external load 116, and is configured to enable the main power supply to provide power to the external load 116 and reduce any burden on the standby power supply 108. For example, when the computing device 102 is in a sleep mode or hibernate mode, the main power supply 106 will typically not be active. However, a user may connect the external load(s) 116 to the computing device 102 during the sleep mode or hibernate mode, causing the system management controller 104 to activate the main power supply 106. In some embodiments, connecting the external load 116 can cause the system management controller 104 to deactivate the standby power supply 108 and activate the main power supply 106 either concurrently or sequentially. Although the main power supply 106 may be activated to accommodate functions related to the external load 116, the main power supply 106 may not be configured to supply power to the external load 116. Therefore, the standby power supply 108 may be left with the burden of supplying power to the external load 116. In order to reduce the burden on the standby power supply 108, the detector 112, will detect an output (e.g., a voltage, current, and/or power output) of the main power supply 106 and compare it to an output threshold accessible to the detector 112. If the output of the main power supply 106 has reached the output threshold, the detector 112 can send an output signal to the switch 110 to activate the switch 110 (e.g., open or close the switch). In some embodiments, the detector 112 will compare the output of the main power supply 106 to an output of the standby power supply 108 and cause the switch 110 to be activated when the output of the main power supply 106 is greater than the output of the standby power supply 108. The main power supply 106 and the standby power supply 108 can be configured to have different output levels to allow for a more effective comparison of the respective outputs at the detector 112. For example, the main power supply 106 can be a 12 volt power supply and the standby power supply 108 can be an 11 volt power supply. However, it should be noted that the main power supply 106 and the standby power supply 108 can be any suitable voltage that will cause a difference to be detected by the detector 112 when both power supplies are operating.

As a result of the comparison at the detector 112 and the switch 110 being activated, a conductive pathway between the switch 110 and the external load 116 will be created, thereby enabling the main power supply 106 to power the external load 116. The switch 110 can be opened or closed in order to provide the conductive pathway between the main power supply 106 and the external load 116. Moreover, the switch 110 can be closed when the output of the main power supply 106 is approaching or exceeds the output threshold defined by the detector 112. Otherwise, the switch 110 can be configured to remain open or deactivated when the output signal from the detector 112 is not received by the switch 110. In some embodiments, the switch 110 is a metal-oxide-semiconductor field-effect transistor (MOSFET), or any other suitable electrical switch.

Figure 2:
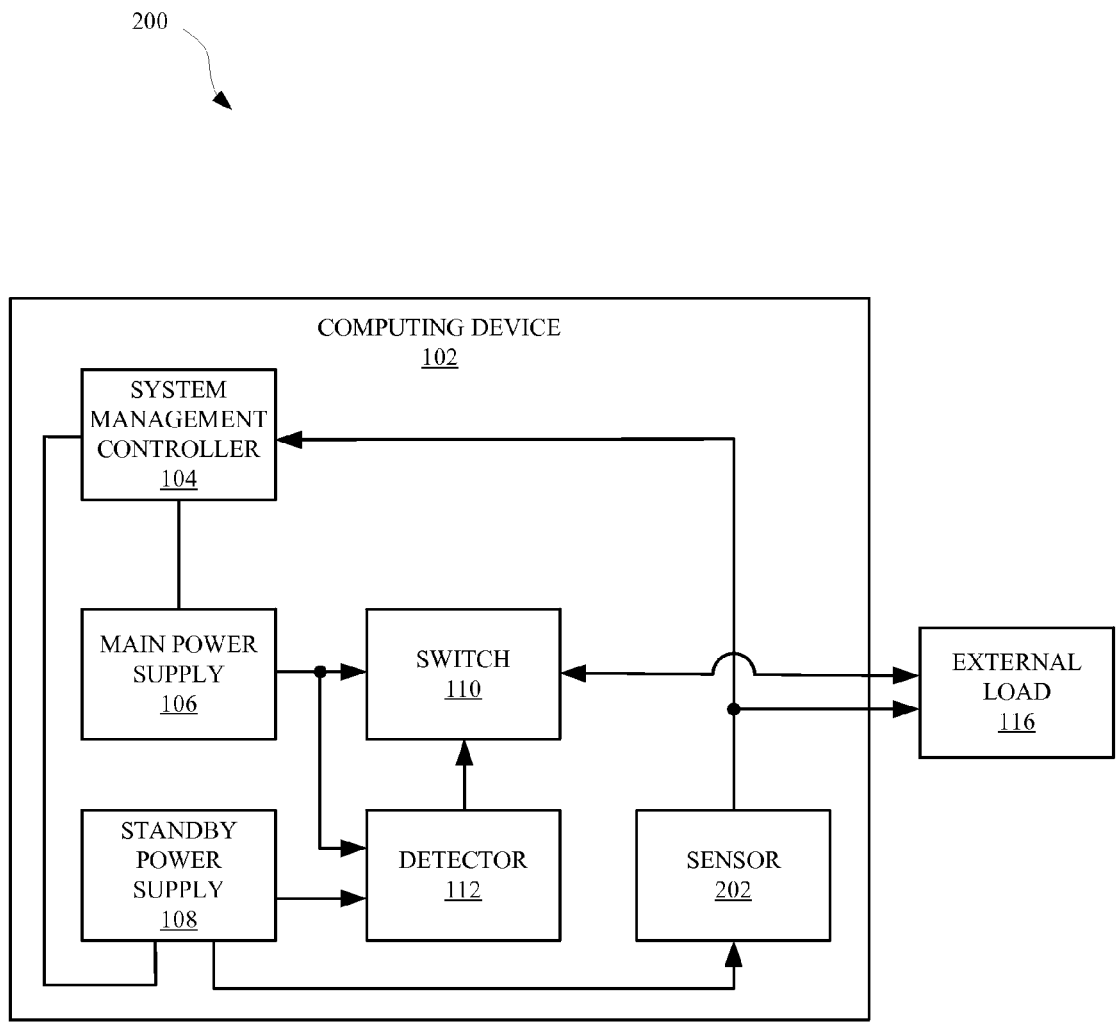
FIG. 2 illustrates a system for intelligently switching between power supplies of the computing device based on a signal measured between the load and the standby power supply.

FIG. 2 illustrates a system 200 for intelligently switching between power supplies of the computing device 102 based on a signal measured between the external load 116 and the standby power supply 108. The signal can include a voltage, current, or power provided from the standby power supply 108 to the external load 116. In order to measure the signal, a sensor 202 is electrically coupled between the standby power supply 108 and the external load 116. The sensor 202 can include a voltage, current, and/or power sensing circuit in order to gauge a burden of energy carried by the standby power supply 108 as a result powering the external load 116. The sensor 202 can be configured to output a signal to the system management controller 104 in order to activate the main power supply 106 in certain circumstances. For example, the sensor 202 can be configured to output the signal to the system management controller 104 when an output of the standby power supply 108 reaches a sensor threshold stored by or accessible to the sensor 202. The sensor threshold can correspond to a maximum voltage, current, and/or power that the standby power supply 108 should not exceed in order to prevent the standby power supply 108 from malfunctioning or shutting off. Additionally, in some embodiments, the sensor 202 can be configured to track the output of the standby power supply 108 over time and determine whether the standby power supply 108 has been operating at a certain output state for a period equal to or greater than a threshold period. In such an embodiment, the sensor 202 would send a signal to the system management controller 104 to activate the main power supply 106 in order to assist the standby power supply 108. Activation of the main power supply 106 can result in the closing of the switch 110 after the detector 112 detects that the main power supply 106 is providing an output. Therefore, the output from the sensor 202 can indirectly result in the switch 110 closing and the main power supply 106 providing power to the external load 116. In some embodiments, the sensor 202 can be configured to cause the standby power supply 108 to shut down in order to protect the standby power supply 108. For example, the sensor 202 can be configured to shutdown the standby power supply 108 when the current drawn from the standby power supply 108 by the external load 116 exceeds a maximum current threshold associated with the standby power supply 108.

FIG. 2 shows the system management controller 104, also referred to herein as SMC, which is available in all power states when AC (alternating current) power is plugged in. SMC is used to control thermal, fans, and related components. Here, SMC also controls the main PSU (power supply unit 106) and the standby PSU (standby power supply 108). The SMC is also attached to the rest of computing device 102, which includes a CPU (central processing unit) and a PCH (platform controller hub). The CPU can communicate with and control the SMC.

The main PSU can provide a 12 volt output, while the standby PSU can provide an 11 volt output. These two power output voltages are different, so that they can be easily distinguished and switched. Because the main PSU has a higher voltage output than the standby PSU, the detector 112 can be used to detect that the 12 volt output of the main PSU is higher than the 11 volt output of the standby PSU, and turn on switch 110 which can be a FET (field effect transistor) to bring the 12 volt output to the external load 116 via a supply line. In one embodiment, the external load 116 can be a USB 5 volt device, or a DIMM (dual in-line memory module) device.

The 11 volt standby PSU is a small power supply which comes on relatively quickly. From a system perspective, the 11 volt standby PSU can be available really early to start doing things, so that the SMC can be powered off the standby PSU. This allows the computing device 102 to quickly decide what to do with the 12 volt main PSU. The 12 volt main PSU takes a little longer to come up, so it is important to handle anything that occurs before the 12 volt main PSU comes on. When the 12 volt main PSU turns on, the detection circuit 110 switches on FET 120 to turn on the path through circuit Q2, allowing the 12 volt output to override the 11 volt output.

Sensor 202 of the computing device 102, in some embodiments, includes a current sense amplifier to detect current being drawn through the supply line. If computing device 102 is sleeping with the main PSU off, then an external device plugged into computer system 100 can cause the current drawn through the supply line to exceed a certain threshold. At that point, the current sense amplifier can send a signal to wake up computing device 102. This is to protect the computing device 102 from brownout situations. Otherwise, the standby PSU power consumption can be overtaxed, in which case the standby PSU can shut itself off for protection. In that case, the computing device 102 would not be able to recover by itself due to the brownout of the standby PSU.

Figure 3:
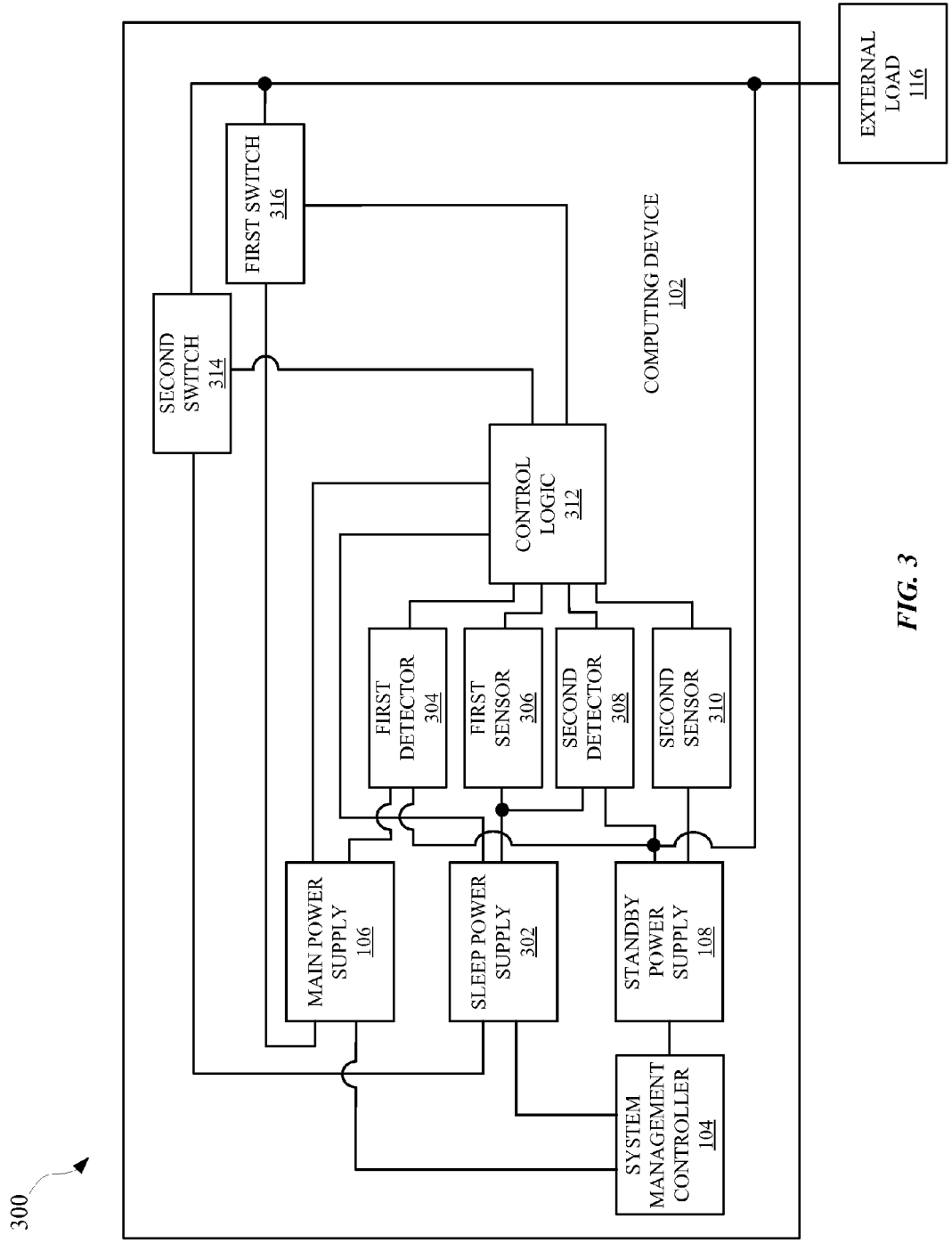
FIG. 3 illustrates a system for intelligently switching between at least three power supplies of a computing device based on a load connected to the computing device.

FIG. 3 illustrates a system 300 for intelligently switching between at least three power supplies of a computing device 102 based on an external load 116 connected to the computing device 102. The system 300 can include the system management controller 104, which can activate the main power supply 106, a sleep power supply 302, and a standby power supply 108. Each power supply can be activated according to the operating mode that the computing device 102 is in and whether the external load 116 is connected to the computing device 102. For example, the system management controller 104 can activate one or more of the main power supply 106, sleep power supply 302, or the standby power supply 108 depending on how much power the external load 116 needs. For example, when the external load 116 only requires a low level of power (e.g., 5 watts or less), the system management controller 104 can turn on the standby power supply 108 exclusively. Additionally, when the external load 116 requires a medium level of power (e.g., between 5 and 25 watts), the system management controller 104 can turn on the sleep power supply 302 exclusively or in combination with the standby power supply 108. Furthermore, when the external load 116 requires a high level of power (e.g., greater than 25 watts), the system management controller 104 can turn on the main power supply 106 exclusively or in combination with the standby power supply 108 and/or the sleep power supply 302. It should be noted that the power supplies discussed herein can be connected to other apparatus, systems, or sub-systems of the computing device 102 even though the wiring of such connections are not expressly shown in the Figures.

When the computing device 102 is in a standby, sleep, or hibernate mode, the computing device 102 can be powered exclusively from the standby power supply 108. However, when an external load 116 is coupled to the computing device 102 or otherwise increased during the sleep mode, the sleep power supply 302 and/or the main power supply 106 can be activated in order assist in powering various operations associated with the external load 116. The operations may not necessarily entail directly powering the external load 116 from the sleep power supply 302 and/or the main power supply 106. Therefore, in order to enable the main power supply 106 and/or the sleep power supply 302 to power the external load 116, various apparatus and modules can be included in the computing device 102. Specifically, each of the main power supply 106, sleep power supply 302, and/or the standby power supply 108 can be electrically coupled to one or more sensors and comparators. In this way, each of the main power supply 106, sleep power supply 302, and/or the standby power supply 108 can be configured to provide power to the external load 116 depending on one or more of their respective outputs. For example, the external load 116 can receive power from one of the respective power supplies based on whether one of the respective power supplies is running and/or based on the whether the output of one or more of the respective power supplies is at or above a certain threshold.

The computing device 102 can include multiple comparators configured to compare an output of the multiple power supplies respectively. Specifically, a first detector 304 can be configured to compare an output of the main power supply 106 to an output of the standby power supply 108 or a first output threshold. A second detector 308 can be configured to compare an output of the sleep power supply 302 to an output of the standby power supply 108 or a second output threshold. In some embodiments, the first detector 304 and the second detector 308 are comparators, or any other suitable electronic device or circuit for comparing electrical signals. The first output threshold and the second output threshold can be associated with a current, voltage, or power value that causes the first detector 304 or second detector 308 to output a logical high or low value depending on how the inputs to the comparators relate to their respective output thresholds. For example, when an output of the sleep power supply 302 has reached or exceeded the second output threshold of the second detector 308, the second detector 308 can output a logical high value to the control logic 312. Additionally, when an output of the main power supply 106 has reached or exceeded the first output threshold of the first detector 304, the first detector 304 can output a logical high value to the control logic 312. When the control logic 312 receives a logical high value from the first detector 304, the control logic 312 can close a first switch 316. By closing the first switch 316, a conductive pathway will be provided between the main power supply 106 and the external load 116, enabling the main power supply 106 to power the external load 116. Similarly, when the control logic 312 receives a logical high value from the second detector 308, the control logic can close a second switch 314. By closing the second switch 314, a conductive pathway will be provided between the sleep power supply 302 and the external load 116, thereby enabling the sleep power supply 302 to power the external load 116. The circuit defining the various switches and comparators can be configured in a low power arrangement in order to reduce any transient effects during switching between power supplies. In this way, a user of the computing device 102 will not experience any interruptions during operation of the computing device 102.

The first output threshold of the first detector 304 can be set such that the first detector 304 outputs a logical high value when the main power supply 106 is at or approaching its normal operating voltage. Additionally, the second output threshold of the second detector 308 can be set such that the second detector outputs a logical high value when the sleep power supply 302 is at or approaching its normal operating voltage. In this way, the standby power supply 108 will be assisted in powering the external load 116 when the either of the sleep power supply 302 and the main power supply 106 are running or otherwise preparing to output their respective operating voltages.

The standby power supply 108 can also be assisted when the current provided by the standby power supply 108 to the external load 116 has reached or exceeded a current threshold. For example, a second sensor 310 can be configured to measure an output current of the standby power supply 108 and output a logical high value to the control logic 312 when the output current exceeds a second sensor threshold of the second sensor 310. Additionally, a first sensor 306 can be configured to measure an output current of the sleep power supply 302 and output a logical high value to the control logic 312 when the output current exceeds a first sensor threshold of the first sensor 306. Thereafter, the control logic 312 can cause the second switch 314 to close and enable the sleep power supply 302 when the output current of the standby power supply 108 exceeds the second sensor threshold of the second sensor 310. In this way, the sleep power supply 302 can assist the standby power supply 108 when the output current of the standby power supply 108 exceeds the second sensor threshold of the second sensor. Moreover, the control logic 312 can close the first switch 316 and enable the main power supply 106 when the output current of the sleep power supply 302 exceeds the first sensor threshold of the first sensor 306. In this way, the main power supply 106 can assist the standby power supply 108 and/or the sleep power supply 302 when the output current of the sleep power supply 302 is at or above the first sensor threshold of the first sensor 306. In some embodiments, the second switch 314 can be opened by the control logic 312 when the first switch 316 is closed in order to protect the sleep power supply 302 from operating outside of its intended current specification. This can provide further assurances that the sleep power supply 302 will be available as a backup if the other power supplies fail. Additionally, in some embodiments, the control logic 312 can communicate with the system management controller 104 in order to enable the power supplies through the system management controller 104.

Each of the power supplies discussed herein can be configured to operate according to a certain power specification. The main power supply 106 can have a power specification greater than the sleep power supply 302, and the sleep power supply 302 can have a greater power specification than the standby power supply 108. For example, the standby power supply 108 can be a 5 watt power supply, the sleep power supply 302 can be a 25 watt power supply, and the main power supply 106 can be 450 watt or 900 watt power supply. Additionally, the main power supply 106 can provide an output voltage that is greater than the output voltage of the sleep power supply 302, and the output voltage of the sleep power supply 302 can be greater than the output voltage of the standby power supply 108. In this way, the comparators discussed herein can better distinguish between outputs of each respective power supply. For example, in some embodiments, the standby power supply 108 is an 11 volt power supply, the sleep power supply 302 is an 11.5 volt power supply and the main power supply 106 is a 12 volt power supply. The detectors and/or comparators discussed herein can also have a detection tolerance, therefore the output voltage of each power supply should at least have a voltage differential that is equal to or greater than the detection tolerance. For example, for a given detection tolerance of a detector, the difference in output voltage between two power supplies electrically coupled to the detector should be at least equal to the detection tolerance. Additionally, each power supply can be electrically coupled to a voltage divider circuit to modify their respective outputs for further defining thresholds for the comparators, as discussed herein.

Figure 4:
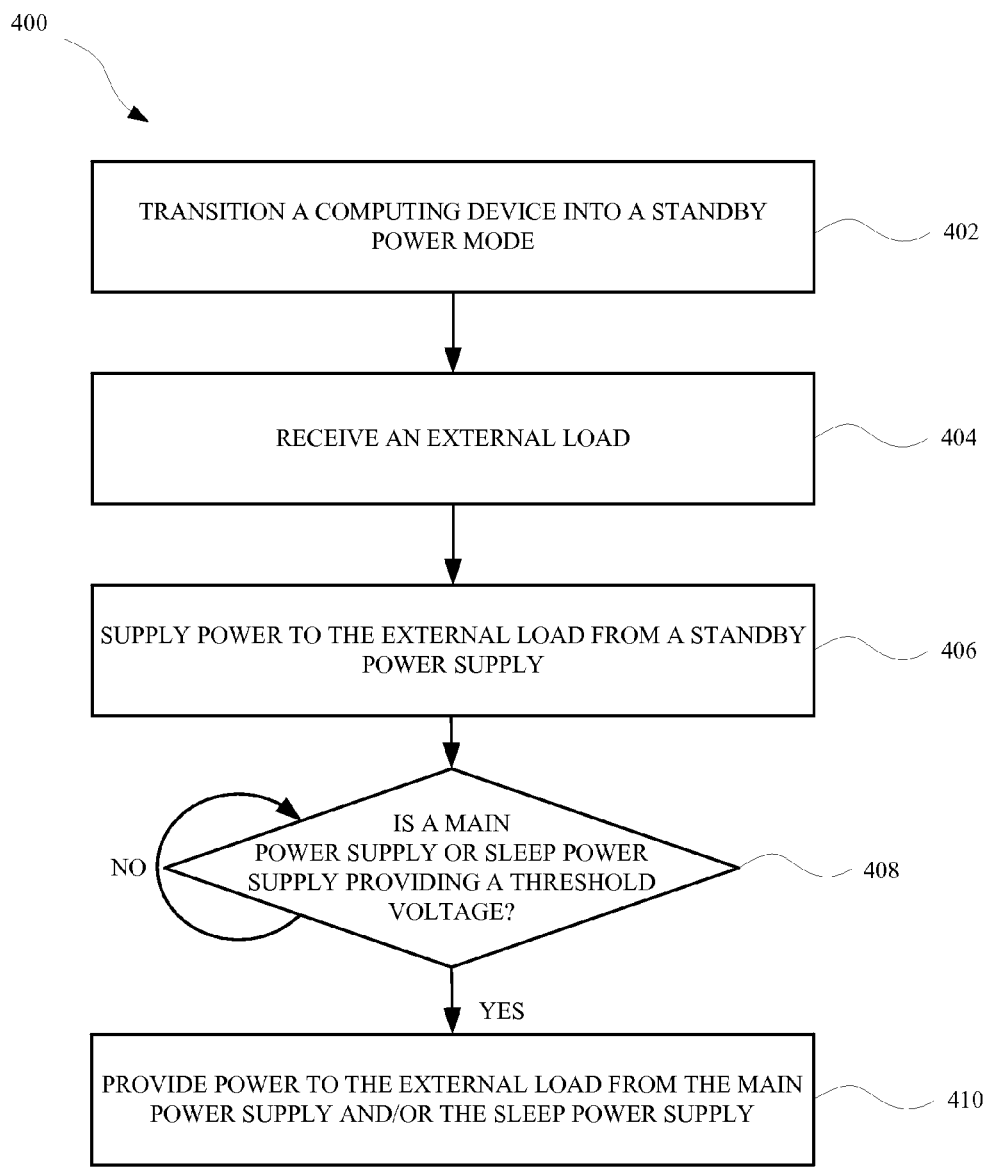
FIG. 4 illustrates a method for intelligently switching on a power supply in order to power a load connected to a computing device during a standby power mode.

FIG. 4 illustrates a method 400 for intelligently switching on a power supply in order to power a load connected to a device during a standby power mode. The method 400 can be performed by any suitable device or module, such as the computing device 102, system management controller 104, or control logic 312 discussed herein. The method 400 can include a step 402 of transitioning a computing device into a standby power mode. The standby power mode can be entered when the computing device is idle, the user instructs the computing device to enter the standby power mode, or when the computing device otherwise determines the standby power mode is to be transitioned into. At step 404, an external load is received at the computing device. The external load can be any suitable electronic device or component capable of being powered by a computing device. At step 406, power is supplied to the load from a standby power supply. Furthermore, at step 408, a determination is made as to whether a main power supply or sleep power supply is providing at least a threshold voltage, as further discussed herein. If the main power supply or sleep power supply are providing at least the threshold voltage, one or more of the main power supply or sleep power supply, at step 410, can be configured to provide power to the external load, as discussed herein. Otherwise, step 408 is repeated while the computing device is in the standby power mode.

Figure 5:
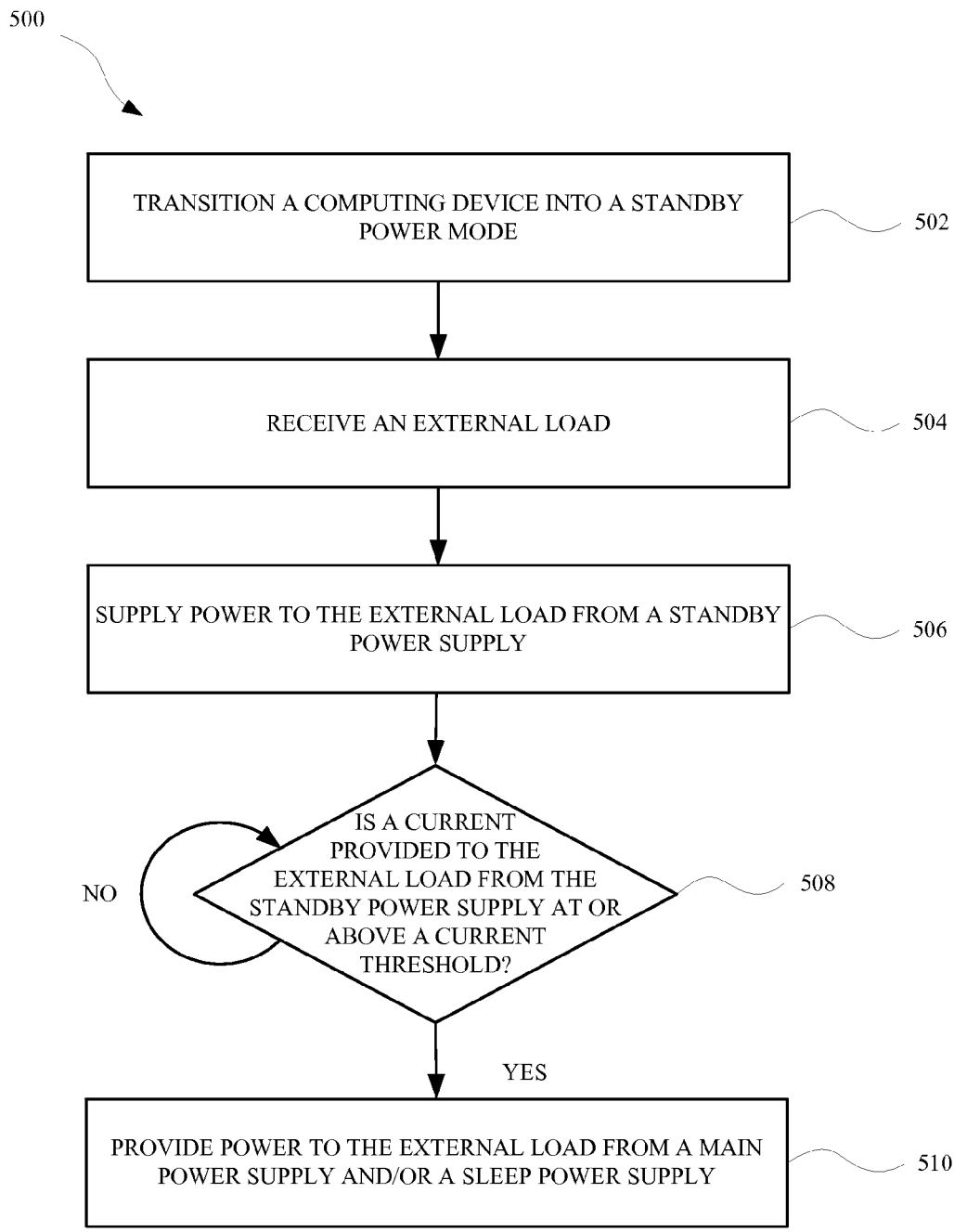
FIG. 5 illustrates a method for powering an external load from one or more power supplies based on the current demanded by the external load.

FIG. 5 illustrates a method 500 for powering an external load from one or more power supplies based on the current demand of by the external load. The method 500 can be performed by any suitable device or module, such as the computing device 102, system management controller 104, or control logic 312 discussed herein. The method 500 can include a step 502 of transitioning a computing device into a standby power mode. At step 504, an external load is received by the computing device. At step 506, power is supplied to the external load from a standby power supply. At step 508, a determination is made as to whether a current provided from the standby power supply to the external load is at or above a current threshold. If the current is at or above the current threshold, at step 510, the external load is supplied power from a main power supply and/or a sleep power supply. Otherwise, step 508 is repeated until the current is at or above the current threshold or the computing device exits the standby power mode.

Figure 6:
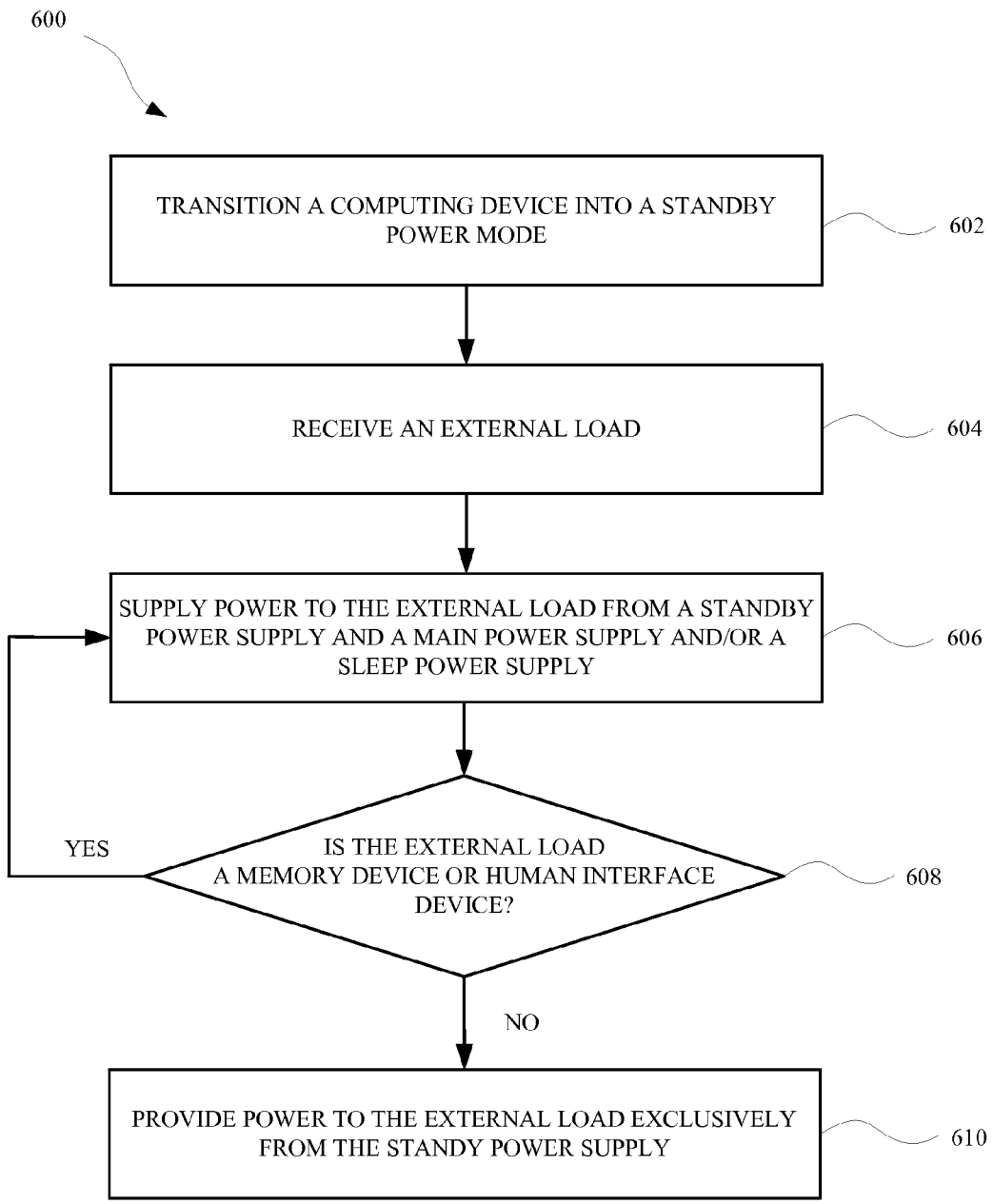
FIG. 6 illustrates a method for powering an external load from one or more power supplies based on whether a memory device or human interface device is connected to a computing device in a standby power mode.

FIG. 6 illustrates a method 600 for disconnecting one or more power supplies from an external load based on whether a memory device or human interface device is connected to a computing device while the computing device is in a standby power mode. The method 600 can be performed by any suitable device or module, such as the computing device 102, system management controller 104, or control logic 312 discussed herein. The method 600 can include a step 602 of transitioning of a computing device into a standby power mode. At step 604, an external load is received at the computing device. At step 606, power is supplied to the external load from a standby power supply and a main power supply and/or a sleep power supply. At step 608, a determination is made as to whether the external load is a memory or a human interface device. In some embodiments, the determination can also include a query regarding the size of the memory, wherein step 610 is executed if the memory is not above a specific memory threshold. For example, in some embodiments the memory threshold is approximately 60 gigabytes, or any other suitable memory size. In other embodiments, the determination at step 608 can also include a query regarding the number of human interface devices (HID's) that are connected to the computing device, wherein step 610 is executed if the number of human interface devices is less than a total HID threshold. For example, in some embodiments the total HID threshold can be two total HID's connected to the computing device. Otherwise, regarding step 608, if a memory device or human interface device is not connected to the computing device, then at step 610, the main power supply and/or sleep power supply are disconnected from the external load. Otherwise, if the external load is a memory device or a human interface device, then step 606 is repeated. In this way, the external load can be provided power exclusively from the standby power supply when a memory or an HID is not connected to the computing device. Alternatively, the external load can be provided power exclusively from the standby power supply when the external load is a memory device that is not above the specific memory threshold or the external load is one or more HID's totaling less than the total HID threshold. In some embodiments, step 610 can include providing power to the external load exclusively from both the standby power supply and the sleep power supply.

Figure 7:
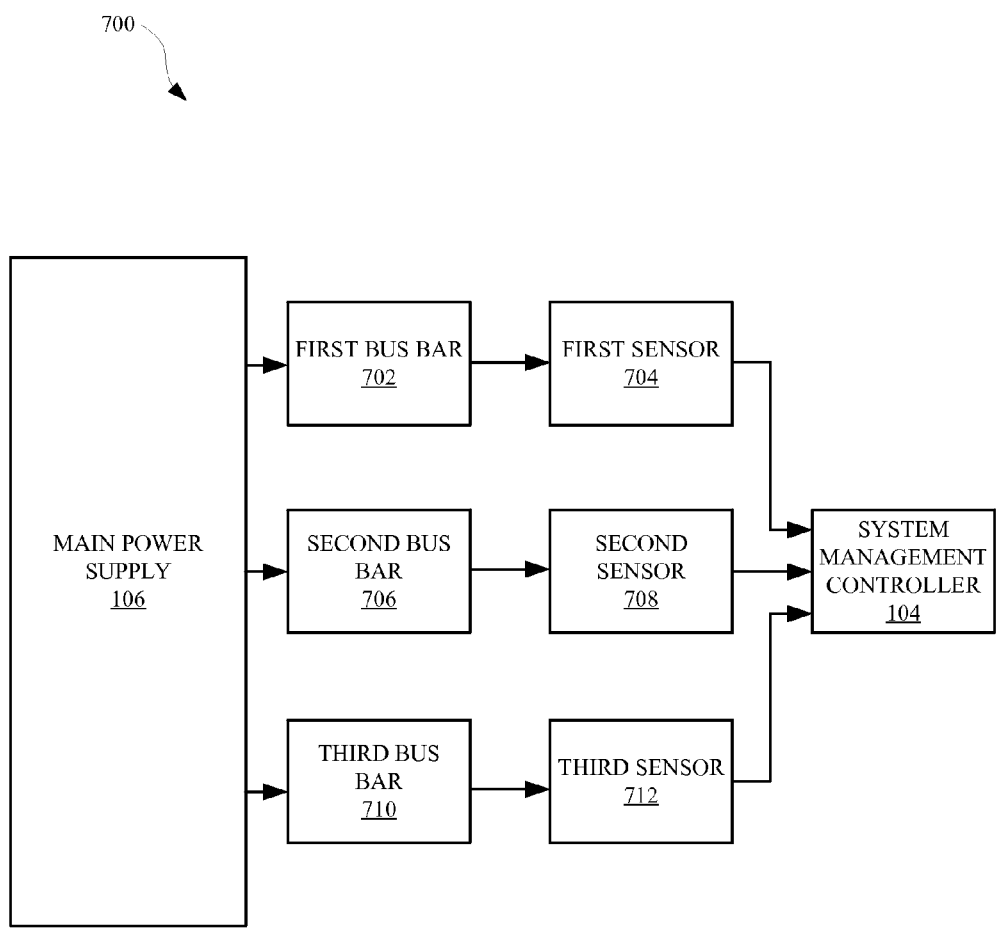
FIG. 7 illustrates a system for determining defects in assembly based on measurements made at one or more bus bars of a computing device.

FIG. 7 illustrates a system 700 for determining defects in a computing device based on measurements made at one or more bus bars of a computing device. The system 700 includes a main power supply 106 of a computing device 102 electrically coupled to multiple bus bars. Specifically, the bus bars include a first bus bar 702, second bus bar 706, and third bus bar 710. The main power supply 106 can be electrically coupled to the respective bus bars by one or more screws or any other suitable mechanism for securing an electrical connection. During an assembly of a computing device, a securing mechanism can be installed inadequately, thereby causing an increase in impedance at a bus bar to which the securing mechanism is coupled. As a result, sub-par voltages will be experienced at the bus bar leading to system failures and downstream reliability issues. Over time, environmental factors such as humidity, dust particles, shock, vibration, and exposure to corrosive gases, can further cause impedance at the bus bar to increase. In order to resolve these issues, the impedance of each bus bar can be sampled over time in order to provide the computing device with a gauge of how the impedance is changing. In this way, the computing device will be able to determine whether to shutdown certain portions of the computing device, or enter a safe mode where the computing device is asleep and displays warning messages to the use when the user attempts to wake the computing device.

The impedance measurements can be performed using one or more sensors electrically coupled to each bus bar respectively. A first sensor 704 can be coupled to the first bus bar 702, a second sensor 708 can be coupled to the second bus bar 706, and a third sensor 712 can be coupled to the third bus bar 710. Each of the sensors can be included in a one or more printed circuit boards (PCB's) respectively, and each of the PCB's can be electrically coupled exclusively to a bus bar. The sensors can be current sensors, voltage sensors, and/or power sensors that take measurements at a respective bus bar according to a predetermined sampling rate. The sensors can include analog to digital converters configured to take samples according to the predetermined sampling rate. In some embodiments the sampling rate is 1 millisecond, but this value can be adjusted to be any suitable value for taking measurements at a bus bar. Additionally, the sampling rate can be different for each sensor at each bus bar. Each of the sensors can include an amplifier in order to amplify a measured signal from the bus bar for generating a more accurate calculation of impedance. The sensors are controlled by the system management controller 104, which can be located on the same or different PCB as one of the sensors. The system management controller 104 can receive measurements from each sensor on each of the multiple PCB's. Using the measurements, the system management controller 104 can calculate voltage, current, or power consumed by each of the PCB's. When the impedance of one of the bus bars increases, spikes or transients will be prevalent in the voltage, current, and/or power measurements. The computing device can be configured to respond to each spike, or track the number of spikes over time in order to respond to a trend in spikes rather than each spike individually. The response by the computing device can be in the form of a notification to the user. For example, the user can be alerted to examine and repair the computing device instead of continuing to run it in an impaired state. In some embodiments, the computing device can force itself in a sleep power mode, then allow the user to wake it, and thereafter be forced into the sleep power mode again or display a warning message. In other embodiments, the computing device can shutdown in response to the detection of spikes or the trend in spikes over time. For example, the computing device may not respond immediately if a few spikes occur during a brief period of time (e.g., an hour) and then no spikes occur for an extended period of time thereafter (e.g., 12 hours).

Figure 8:
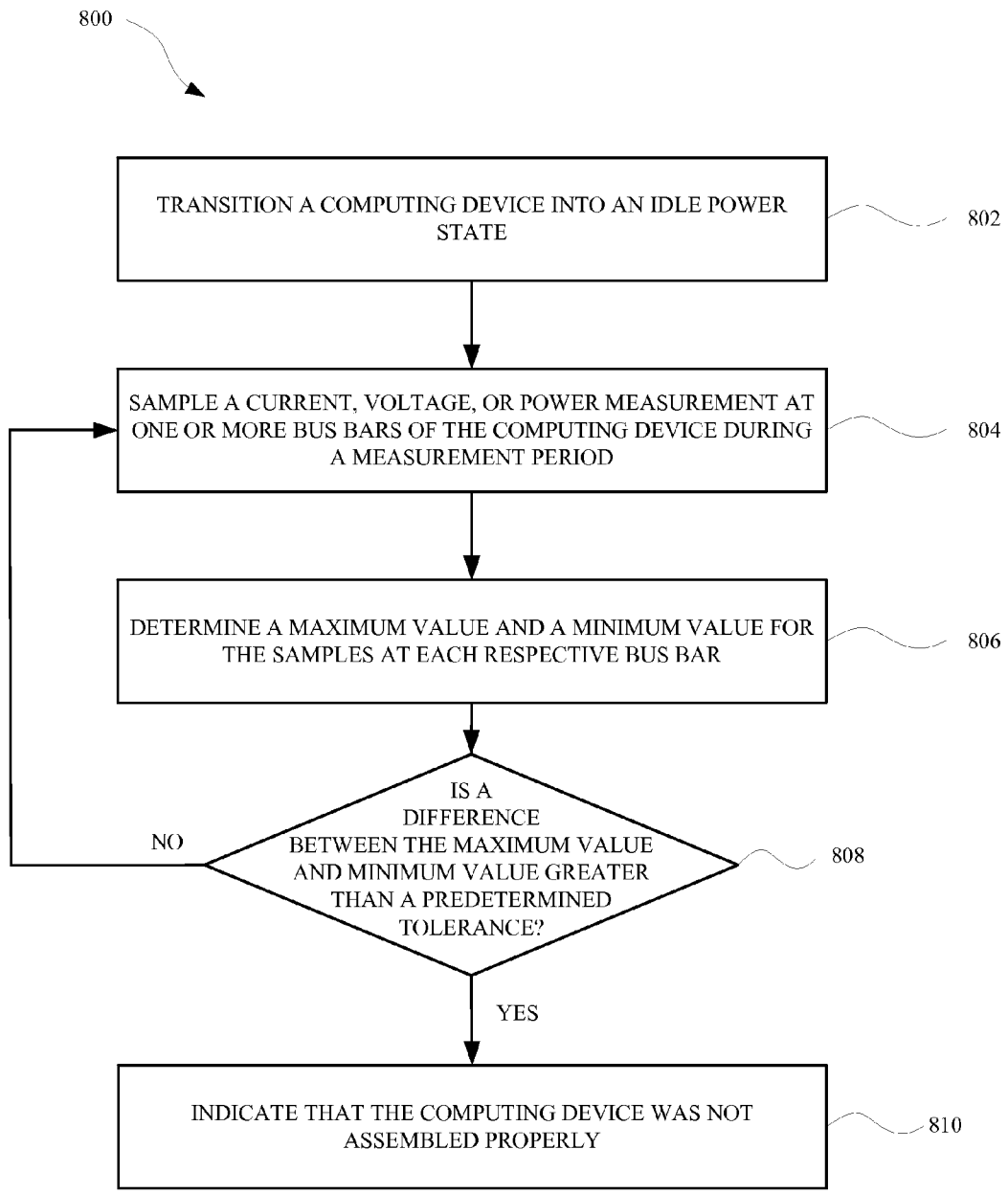
FIG. 8 illustrates a method for determining whether a computing device has been improperly assembled based on measurements taken at one or more bus bars.

FIG. 8 illustrates a method 800 for determining whether a computing device has been improperly assembled based on measurements taken at one or more bus bars. The method 800 can be performed by an apparatus or software module within the computing device, such as the system management controller 104. In other embodiments, the method 800 can be performed by an external device during or after manufacturing of the computing device. At step 802, the computing device is transitioned into an idle power state. In this way, the load on the power supply can be kept low for purposes of taking consistent measurements at the bus bars coupled to the power supply. At step 804, a current, voltage, and or power measurement at one or more bus bars of the computing device is sampled during a measurement period. The measurement period can be brief in order to not interrupt the user experience. For example, in some embodiments the measurement period is can be 15 seconds or 30 seconds, or any other suitable time period that would not interrupt the user experience. At step 806, a maximum value and a minimum value for the samples is determined for the bus bars. At step 808, a difference between the maximum value and the minimum value is compared to a predetermined tolerance. If the difference is equal to or greater than the tolerance, then at step 810, then the computing device or system analyzing the measurements indicates that the computing device was not assembled properly. The predetermined tolerance can be any suitable value for distinguishing normal voltage spikes from spikes that occur as a result of improper assembly. For example, in some embodiments the predetermined tolerance can be approximately 0.25 volts. However, this value can be modified to be smaller or bigger depending on computing device or power supply connected to the bus bars. At step 808, if the difference is not greater than or equal to the predetermined tolerance, step 804 can be repeated until the computing device transitions out of the idle power state. Otherwise, the method 800 can terminate after one complete measurement period has occurred. Thereafter, the measurement period can occur again the next time the computing device enters the idle power state. In some embodiments, each of the bus bars is associated with different sub-systems of a computing device. For example, one or more of the bus bars can be electrically coupled to a main logic board of the computing device, a PCB that includes a central processing unit or graphics processing unit, or any other PCB having one or more input and output devices.

Figure 9:
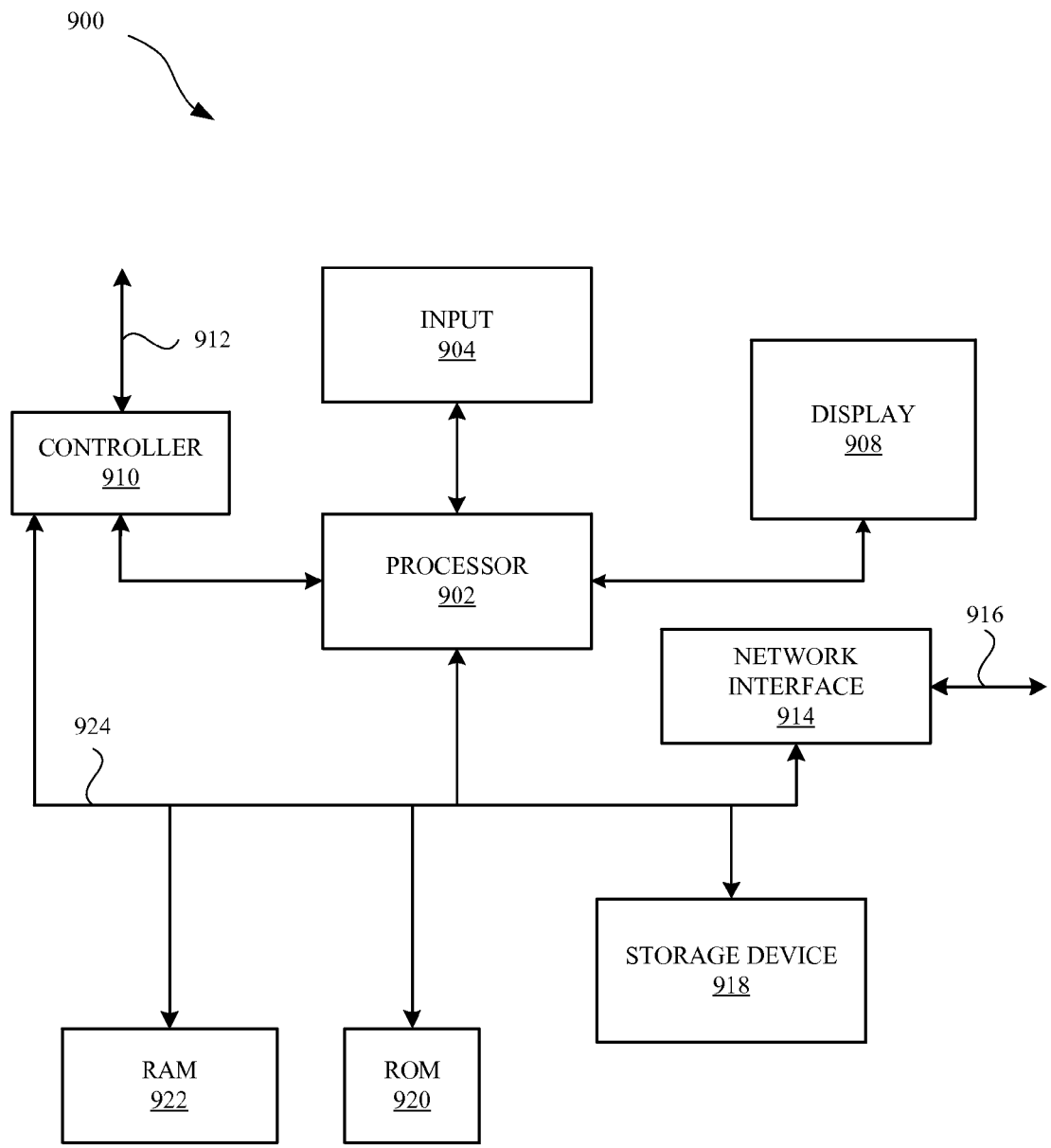
FIG. 9 is a block diagram of a computing device that can represent components of the computing device or system management controller discussed herein.

FIG. 9 is a block diagram of a computing device 900 that can represent the components of the computing device 102, system management controller 104, or any other suitable device for enabling the embodiments and methods discussed herein. It will be appreciated that the components, devices or elements illustrated in and described with respect to FIG. 9 may not be mandatory and thus some may be omitted in certain embodiments. The computing device 900 can include a processor 902 that represents a microprocessor, a coprocessor, circuitry and/or a controller for controlling the overall operation of computing device 900. Although illustrated as a single processor, it can be appreciated that the processor 902 can include a plurality of processors. The plurality of processors can be in operative communication with each other and can be collectively configured to perform one or more functionalities of the computing device 900 as described herein. In some embodiments, the processor 902 can be configured to execute instructions that can be stored at the computing device 900 and/or that can be otherwise accessible to the processor 902. As such, whether configured by hardware or by a combination of hardware and software, the processor 902 can be capable of performing operations and actions in accordance with embodiments described herein.

The computing device 900 can also include user input device 904 that allows a user of the computing device 900 to interact with the computing device 900. For example, user input device 904 can take a variety of forms, such as a button, keypad, dial, touch screen, audio input interface, visual/image capture input interface, input in the form of sensor data, etc. Still further, the computing device 900 can include a display 908 (screen display) that can be controlled by processor 902 to display information to a user. Controller 910 can be used to interface with and control different equipment through equipment control bus 912. The computing device 900 can also include a network/bus interface 914 that couples to data link 916. Data link 916 can allow the computing device 900 to couple to a host computer or to accessory devices. The data link 916 can be provided over a wired connection or a wireless connection. In the case of a wireless connection, network/bus interface 914 can include a wireless transceiver.

The computing device 900 can also include a storage device 918, which can have a single disk or a plurality of disks (e.g., hard drives) and a storage management module that manages one or more partitions (also referred to herein as "logical volumes") within the storage device 918. In some embodiments, the storage device 918 can include flash memory, semiconductor (solid state) memory or the like. Still further, the computing device 900 can include Read-Only Memory (ROM) 920 and Random Access Memory (RAM) 922. The ROM 920 can store programs, code, instructions, utilities or processes to be executed in a non-volatile manner. The RAM 922 can provide volatile data storage, and store instructions related to components of the storage management module that are configured to carry out the various techniques described herein. The computing device 900 can further include data bus 924. Data bus 924 can facilitate data and signal transfer between at least processor 902, controller 910, network interface 914, storage device 918, ROM 920, and RAM 922.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable storage medium. The computer readable storage medium can be any data storage device that can store data which can thereafter be read by a computer system. Examples of the computer readable storage medium include read-only memory, random-access memory, CD-ROMs, HDDs, DVDs, magnetic tape, and optical data storage devices. The computer readable storage medium can also be distributed over network-coupled computer systems so that the computer readable code is stored and executed in a distributed fashion. In some embodiments, the computer readable storage medium can be non-transitory.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A computing system, comprising:
a standby power supply electrically coupled to a sensor, wherein the sensor is configured to produce a sensor signal based on an output from the standby power supply during a standby mode of the computing system; and
a controller electrically coupled to the sensor, wherein the controller is configured to:
receive the sensor signal from the sensor,
when the sensor signal indicates that the output has reached or exceeded an output threshold, enable a main power supply to provide power to an external load removably attached to the computing system, and
determine whether the external, removably attached load is a memory device and provide an enable signal to the main power supply when the memory device has a capacity that is equal to or greater than a memory threshold.

2. The computing system of claim 1, further comprising:
a signal detector configured to produce a comparison result based on: i) an output voltage of the main power supply, and ii) the output of the standby power supply, wherein the comparison result is used to control a switch electrically coupled between the main power supply and the external, removably attached load.

3. A machine-readable non-transitory storage medium storing instructions that, when executed by a processor included in a computing device, cause the computing device to carry out steps that include:
receiving a current sensor output;
determining whether an external, removably attached load is one or more human interface devices and provide an enable signal to a main power supply when the external, removably attached load is determined to be one or more human interface devices and when a total number of human interface devices reaches or exceeds a threshold total; and
turning on the main power supply when the current sensor output indicates a current flowing from a standby power supply to the external, detachably connected load and responsive to the enable signal.

4. The machine-readable non-transitory storage medium of claim 3, wherein the computing device is configured to operate in at least a normal power mode, and the computing device consumes less power in a standby power mode than in the normal power mode.

5. The machine-readable non-transitory storage medium of claim 3, wherein the steps further include:
receiving a user input and transitioning out of a standby power mode while contemporaneously providing power to the external, detachably connected load from the main power supply and the standby power supply.

6. The computing system of claim 1, wherein the computing system is configured to supply power to the external, removably attached load while a central processing unit (CPU) of the computing system remains in a sleep mode.

7. The computing system of claim 2, wherein the switch is a field effect transistor (FET).

8. The computing system of claim 2, wherein the output voltage of the main power supply exceeds an output voltage of the standby power supply.

9. The machine-readable non-transitory storage medium of claim 4, wherein the main power supply and the standby power supply are internal to the computing device.

10. A computing system, comprising:
a standby power supply electrically coupled to a sensor, wherein the sensor is configured to produce a sensor signal based on an output from the standby power supply during a standby mode of the computing system; and
a controller electrically coupled to the sensor, wherein the controller is configured to:
receive the sensor signal from the sensor,
when the sensor signal indicates that the output has reached or exceeded an output threshold, enable a main power supply to provide power to an external load removably attached to the computing system, and
determine whether the external, removably attached load is one or more human interface devices and provide an enable signal to the main power supply when the external, removably attached load is determined to be one or more human interface devices and when a total number of human interface devices reaches or exceeds a threshold total.

11. The computing system of claim 10, further comprising:
a signal detector configured to produce a comparison result based on: i) an output voltage of the main power supply, and ii) the output of the standby power supply, wherein the comparison result is used to control a switch electrically coupled between the main power supply and the external, removably attached load.

* * * * *